(12) United States Patent
Kalkunte et al.

(10) Patent No.: US 8,005,084 B2
(45) Date of Patent: Aug. 23, 2011

(54) MIRRORING IN A NETWORK DEVICE

(75) Inventors: Mohan Kalkunte, Sunnyvale, CA (US); Venkateshwar Buduma, San Jose, CA (US); Puneet Agarwal, Cupertino, CA (US); Gurumurthy Yelewarapu, Santa Clara, CA (US); Song-Huo Yu, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 1016 days.

(21) Appl. No.: 11/289,366

(22) Filed: Nov. 30, 2005

(65) Prior Publication Data

US 2006/0140130 A1 Jun. 29, 2006

Related U.S. Application Data

(60) Provisional application No. 60/631,548, filed on Nov. 30, 2004, provisional application No. 60/686,403, filed on Jun. 2, 2005.

(51) Int. Cl.
*H04L 12/28* (2006.01)
(52) U.S. Cl. ...................................................... 370/390
(58) Field of Classification Search .................. 370/241, 370/390, 382
See application file for complete search history.

(56) References Cited

U.S. PATENT DOCUMENTS

| | | | |
|---|---|---|---|
| 6,041,042 A * | 3/2000 | Bussiere ....................... | 370/245 |
| 6,335,932 B2 | 1/2002 | Kadambi et al. | |
| 6,496,502 B1 * | 12/2002 | Fite et al. ....................... | 370/389 |
| 6,535,510 B2 | 3/2003 | Kalkunte et al. | |
| 6,674,743 B1 | 1/2004 | Amara et al. | |
| 6,792,502 B1 | 9/2004 | Pandya et al. | |
| 6,804,233 B1 | 10/2004 | Congdon et al. | |
| 6,807,179 B1 | 10/2004 | Kanuri et al. | |
| 6,963,921 B1 | 11/2005 | Yang et al. | |
| 6,993,026 B1 | 1/2006 | Baum et al. | |
| 7,020,139 B2 | 3/2006 | Kalkunte et al. | |
| 7,031,304 B1 * | 4/2006 | Arberg et al. ................. | 370/360 |
| 7,054,315 B2 | 5/2006 | Liao | |
| 7,089,240 B2 | 8/2006 | Basso et al. | |
| 7,127,566 B2 * | 10/2006 | Ramakrishnan et al. ..... | 711/152 |
| 7,139,753 B2 | 11/2006 | Bass et al. | |
| 7,161,948 B2 * | 1/2007 | Sampath et al. .............. | 370/402 |
| 7,292,567 B2 | 11/2007 | Terrell et al. | |
| 7,292,573 B2 * | 11/2007 | LaVigne et al. .............. | 370/390 |
| 7,313,135 B2 | 12/2007 | Wyatt | |
| 7,327,748 B2 | 2/2008 | Montalvo et al. | |
| 7,359,383 B2 | 4/2008 | Wakumoto et al. | |

(Continued)

OTHER PUBLICATIONS

Non-Final Office Action received for U.S. Appl. No. 12/135,720 mailed on Mar. 19, 2009, 8 pages.

(Continued)

*Primary Examiner* — Derrick W Ferris
*Assistant Examiner* — Mohammad Anwar

(57) ABSTRACT

A network device for implementing mirroring on packets. The network device includes a plurality of ports, each of which is at least one of an ingress port, an egress port and a mirror-to port. The network device also includes processing means for supporting a plurality of mirroring types. Each of the ingress port, egress port and mirror-to port includes at least one register for supporting the plurality of mirroring types. To support mirroring at each of the ingress port, egress port and mirror-to port predefined bits in the at least one register are set. When an incoming packet is received, the predefined bits are examined to determine which of the plurality of mirroring types to apply to the packet.

20 Claims, 5 Drawing Sheets

U.S. PATENT DOCUMENTS

| | | | |
|---|---|---|---|
| 7,382,787 | B1 | 6/2008 | Barnes et al. |
| 7,408,932 | B2 | 8/2008 | Kounavis et al. |
| 7,408,936 | B2 | 8/2008 | Ge et al. |
| 7,417,990 | B2 | 8/2008 | Ikeda et al. |
| 7,499,456 | B2 | 3/2009 | De Silva et al. |
| 7,515,610 | B2 | 4/2009 | Amagai et al. |
| 7,525,919 | B2 | 4/2009 | Matsui et al. |
| 7,570,639 | B2 | 8/2009 | Kalkunte et al. |
| 7,680,107 | B2 | 3/2010 | Kalkunte |
| 7,715,384 | B2 | 5/2010 | Kalkunte et al. |
| 7,826,481 | B2 | 11/2010 | Kalkunte et al. |
| 7,830,892 | B2 | 11/2010 | Kalkunte et al. |
| 2002/0010791 | A1 | 1/2002 | Kalkunte et al. |
| 2002/0027908 | A1 | 3/2002 | Kalkunte et al. |
| 2002/0126672 | A1 | 9/2002 | Chow et al. |
| 2003/0123459 | A1 | 7/2003 | Liao |
| 2003/0142668 | A1 | 7/2003 | Wyatt |
| 2003/0147385 | A1 | 8/2003 | Montalvo et al. |
| 2004/0236720 | A1 | 11/2004 | Basso et al. |
| 2005/0008009 | A1 | 1/2005 | Chen et al. |
| 2005/0013306 | A1 | 1/2005 | Albrecht |
| 2005/0018693 | A1 | 1/2005 | Dull |
| 2005/0076010 | A1 | 4/2005 | Bass et al. |
| 2005/0083885 | A1 | 4/2005 | Ikeda et al. |
| 2005/0083935 | A1 | 4/2005 | Kounavis et al. |
| 2005/0129019 | A1 | 6/2005 | Cheriton |
| 2005/0138149 | A1 | 6/2005 | Bhatia |
| 2005/0163102 | A1 | 7/2005 | Higashitaniguchi et al. |
| 2005/0180391 | A1 | 8/2005 | Shimada |
| 2005/0190773 | A1 | 9/2005 | Yang et al. |
| 2006/0002393 | A1 | 1/2006 | Lappin, Jr. et al. |
| 2006/0039383 | A1 | 2/2006 | Ge et al. |
| 2006/0050702 | A1 | 3/2006 | Matsui et al. |
| 2006/0072572 | A1 | 4/2006 | Ikeda et al. |
| 2006/0114876 | A1 | 6/2006 | Kalkunte |
| 2006/0114901 | A1 | 6/2006 | Kalkunte et al. |
| 2006/0114908 | A1 | 6/2006 | Kalkunte et al. |
| 2006/0114915 | A1 | 6/2006 | Kalkunte et al. |
| 2006/0114938 | A1 | 6/2006 | Kalkunte et al. |
| 2006/0182034 | A1 | 8/2006 | Klinker et al. |
| 2007/0025380 | A1 | 2/2007 | Amagai et al. |
| 2007/0110078 | A1 | 5/2007 | De Silva et al. |
| 2008/0095062 | A1 | 4/2008 | Shankar et al. |
| 2008/0117913 | A1 | 5/2008 | Tatar et al. |
| 2010/0142536 | A1 | 6/2010 | Kalkunte et al. |

OTHER PUBLICATIONS

Notice of Allowance Received for U.S. Appl. No. 11/289,499, mailed on Apr. 3, 2009, 16 pages.
Non-Final Office Action Received for U.S. Appl. No. 11/289,499, mailed on Oct. 15, 2008, 12 pages.
Non-Final Office Action Received for U.S. Appl. No. 11/289,368, mailed on Mar. 19, 2009, 9 pages.
Non-Final Office Action Received for U.S. Appl. No. 11/289,369, mailed on Mar. 18, 2009, 19 pages.
Non-Final Office Action Received for U.S. Appl. No. 11/289,370, mailed on Oct. 29, 2008, 7 pages.
Non-Final Office Action Received for U.S. Appl. No. 11/289,370, mailed on May 1, 2009, 7 pages.
Non-Final Office Action Received for U.S. Appl. No. 11/289,497, mailed on Oct. 15, 2008, 13 pages.
Final Office Action Received for U.S. Appl. No. 11/289,497, mailed on Mar. 18, 2009, 13 pages.
Notice of Allowance Received for U.S. Appl. No. 11/289,497, mailed on Jun. 12, 2009, 12 pages.
Final Office Action Received for U.S. Appl. No. 11/289,687, mailed on Jun. 30, 2009, 11 pages.
Non-Final Office Action Received for U.S. Appl. No. 11/289,687, mailed on Dec. 24, 2008, 9 pages.
Non-Final Office Action Received for U.S. Appl. No. 11/289,687, mailed on Aug. 5, 2008, 10 pages.
Notice of Allowance for U.S. Appl. No. 11/289,368, mailed on Sep. 15, 2009, 17 pages.
Response to Office Action for U.S. Appl. No. 11/289,368, filed on Jul. 21, 2009, 14 pages.
Office Action for U.S. Appl. No. 11/289,369, mailed on Oct. 13, 2009, 33 pages.
Response to Office Action for U.S. Appl. No. 11/289,369, filed on Jun. 18, 2009, 14 pages.
Notice of Allowance for U.S. Appl. No. 11/289,370, mailed on Oct. 6, 2009, 12 pages.
Response to Office Action for U.S. Appl. No. 11/289,370, filed on Aug. 3, 2009, 19 pages.
Response to Office Action for U.S. Appl. No. 11/289,370, filed on Jan. 29, 2009, 15 pages.
Response to Office Action for U.S. Appl. No. 11/289,499, filed on Feb. 15, 2009, 7 pages.
Response to Office Action for U.S. Appl. No. 11/289,687, filed on Mar. 24, 2009, 11 pages.
Response to Office Action for U.S. Appl. No. 11/289,687, filed on Oct. 6, 2008, 15 pages.
Response to Office Action for U.S. Appl. No. 11/289,687, filed on Oct. 30, 2009, 13 pages.
Office Action received for U.S. Appl. No. 11/289,687, mailed on Feb. 3, 2010.
U.S. Appl. No. 11/289,687 Final Office Action mailed Sep. 7, 2010.
Office Action Response for U.S. Appl. No. 11/289,497, filed on Feb. 17, 2009, 8 pages.
Office Action Response for U.S. Appl. No. 11/289,497, filed on May 20, 2009, 11 pages.
Supplemental Notice of Allowability for U.S. Appl. No. 11/289,497, mailed on Sep. 21, 2009, 17 pages.
Supplemental Notice of Allowability for U.S. Appl. No. 11/289,497, mailed on Dec. 24, 2009, 17 pages.
Supplemental Notice of Allowability for U.S. Appl. No. 11/289,370, mailed on Dec. 2, 2009, 8 pages.
Notice of Allowance for U.S. Appl. No. 11/289,368, mailed on Jan. 14, 2010, 18 pages.
Notice of Allowance for U.S. Appl. No. 11/289,369, mailed on Apr. 28, 2010, 50 pages.
Notice of Allowance for U.S. Appl. No. 11/289,370, mailed on Aug. 11, 2010, 8 pages.
Notice of Allowance for U.S. Appl. No. 11/289,369, mailed on Aug. 16, 2010, 6 pages.
Notice of Allowance for U.S. Appl. No. 11/289,497, mailed on Sep. 21, 2009, 17 pages.
Notice of Allowance for U.S. Appl. No. 11/289,370, mailed on Mar. 25, 2010, 9 pages.
Office Action for U.S. Appl. No. 12/706,481, mailed on Sep. 16, 2010, 46 pages.
Office Action Response for U.S. Appl. No. 11/289,369, filed on Jan. 13, 2010, 12 pages.
Office Action Response for U.S. Appl. No. 11/289,687, filed on Jun. 3, 2010, 11 pages.
Office Action Response for U.S. Appl. No. 12/706,481, filed on Jan. 18, 2011, 15 pages.
Office Action Response for U.S. Appl. No. 11/289,687, filed on Mar. 4, 2011, 11 pages.
Office Action received for U.S. Appl. No. 12/706,481, mailed on Mar. 28, 2011, 50 pages.
US 7,769,029, 08/2010, Kalkunte et al. (withdrawn)

* cited by examiner

MIRRORING IN A NETWORK DEVICE

CROSS-REFERENCE TO RELATED APPLICATIONS

This application claims priority of U.S. Provisional Patent Application Ser. No. 60/631,548, filed on Nov. 30, 2004 and U.S. Provisional Patent Application Ser. No. 60/668,403, filed on Jun. 2, 2005. The subject matter of these earlier filed applications is hereby incorporated by reference.

BACKGROUND OF THE INVENTION

1. Field of the Invention

The present invention relates to a network device in a data network and more particularly to the mirroring of data received by a network device.

2. Description of the Related Art

A packet switched network may include one or more network devices, such as a Ethernet switching chip, each of which includes several modules that are used to process information that is transmitted through the device. Specifically, the device includes an ingress module, a Memory Management Unit (MMU) and an egress module. The ingress module includes switching functionality for determining to which destination port a packet should be directed. The MMU is used for storing packet information and performing resource checks. The egress module is used for performing packet modification and for transmitting the packet to at least one appropriate destination port. One of the ports on the device may be a CPU port that enables the device to send and receive information to and from external switching/routing control entities or CPUs.

In order to properly monitor packets, often the packet flow needs to be monitored to determine if the network device is functioning properly. In prior art devices, the packets being sent to a given port could be "mirrored" to another port where the packet flow could be examined. The mirroring process is important in that the flow of the packets to a given destination port need not be interrupted to examine the flow to that destination port. Therefore, in these devices, the packets that were received by a "mirrored-to" port were examined at the latter port with no disruption to the flow of packets to the actual destination port.

For most prior art network devices, for a destination or source port, only one mirrored-to port may be specified. However, there is a need for a network device to mirror packets to multiple ports. Furthermore, if a packet received at a given port of a network device is forwarded to another port, the header may be modified to aid in that forwarding operation. Thus, packets that are mirrored are modified as a consequence of forwarding the packet. However, there is also a need for mirroring modified and unmodified packets.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
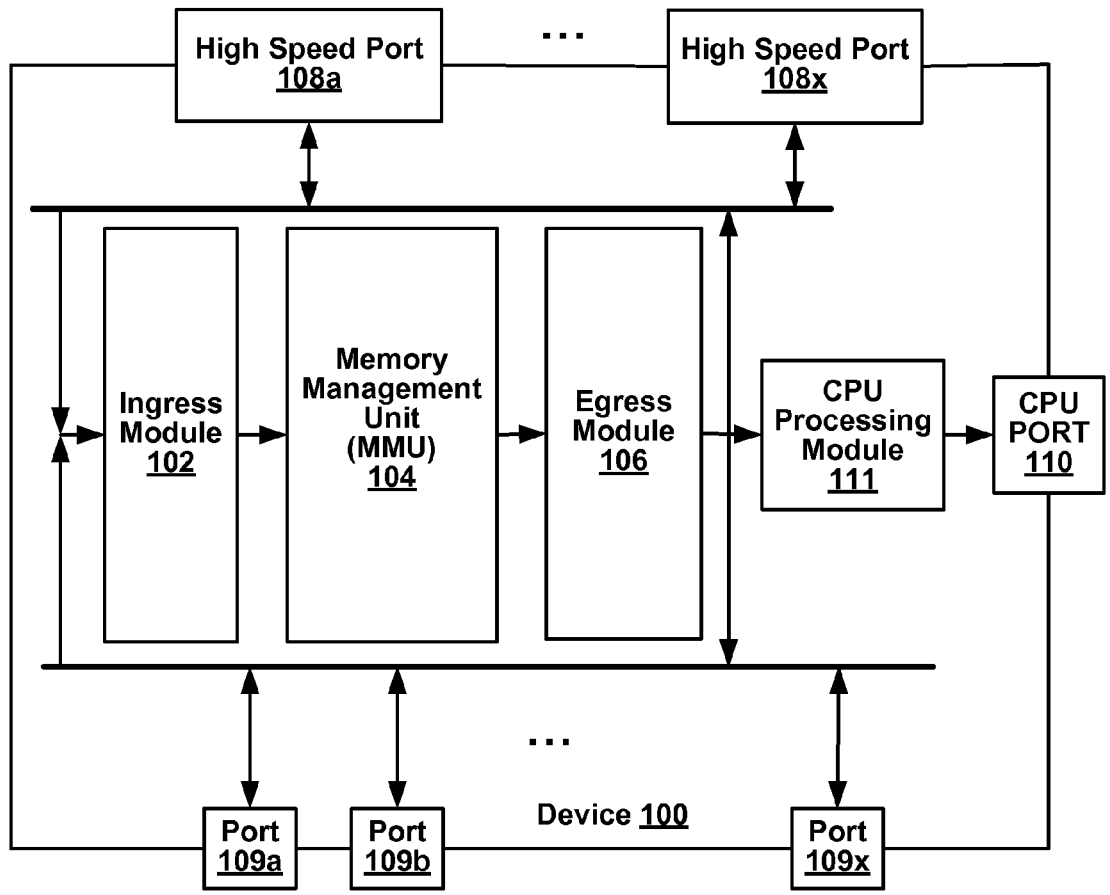
FIG. 1 illustrates a network device in which an embodiment of the present invention may be implemented.

FIG. 1 illustrates a network device, such as a switching chip, in which an embodiment the present invention may be implemented. Device 100 includes an ingress module 102, a MMU 104, and an egress module 106. Ingress module 102 is used for performing switching functionality on an incoming packet. MMU 104 is used for storing packets and performing resource checks on each packet. Egress module 106 is used for performing packet modification and transmitting the packet to an appropriate destination port. Each of ingress module 102, MMU 104 and Egress module 106 includes multiple cycles for processing instructions generated by that module. Device 100 implements a pipelined approach to process incoming packets. The device 100 has the ability of the pipeline to process, according to one embodiment, one packet every clock cycle. According to one embodiment of the invention, the device 100 includes a 133.33 MHz core clock. This means that the device 100 architecture is capable of processing 133.33 M packets/sec.

Device 100 may also include one or more internal fabric high speed ports, for example a HiGig™, high speed port 108a-108x, one or more external Ethernet ports 109a-109x, and a CPU port 110. High speed ports 108a-108x are used to interconnect various network devices in a system and thus form an internal switching fabric for transporting packets between external source ports and one or more external destination ports. As such, high speed ports 108a-108x are not externally visible outside of a system that includes multiple interconnected network devices. CPU port 110 is used to send and receive packets to and from external switching/routing control entities or CPUs. According to an embodiment of the invention, CPU port 110 may be considered as one of external Ethernet ports 109a-109x. Device 100 interfaces with external/off-chip CPUs through a CPU processing module 111, such as a CMIC, which interfaces with a PCI bus that connects device 100 to an external CPU.

Network traffic enters and exits device 100 through external Ethernet ports 109a-109x. Specifically, traffic in device 100 is routed from an external Ethernet source port to one or more unique destination Ethernet ports 109a-109x. In one embodiment of the invention, device 100 supports physical Ethernet ports and logical (trunk) ports. A physical Ethernet port is a physical port on device 100 that is globally identified by a global port identifier. In an embodiment, the global port identifier includes a module identifier and a local port number that uniquely identifies device 100 and a specific physical port. The trunk ports are a set of physical external Ethernet ports that act as a single link layer port. Each trunk port is assigned a global trunk group identifier (TGID). According to an embodiment, device 100 can support up to 128 trunk ports, with up to 8 members per trunk port, and up to 29 external physical ports. Destination ports 109a-109x on device 100 may be physical external Ethernet ports or trunk ports. If a destination port is a trunk port, device 100 dynamically selects a physical external Ethernet port in the trunk by using a hash to select a member port. As explained in more detail below, the dynamic selection enables device 100 to allow for dynamic load sharing between ports in a trunk.

Once a packet enters device 100 on a source port 109a-109x, the packet is transmitted to ingress module 102 for processing. Packets may enter device 100 from a XBOD or a GBOD. In this embodiments, the XBOD is a block that has one 10GE/12G MAC and supports packets from high speed ports 108a-108x. The GBOD is a block that has 12 10/100/1G MAC and supports packets from ports 109a-109x.

Figure 2:
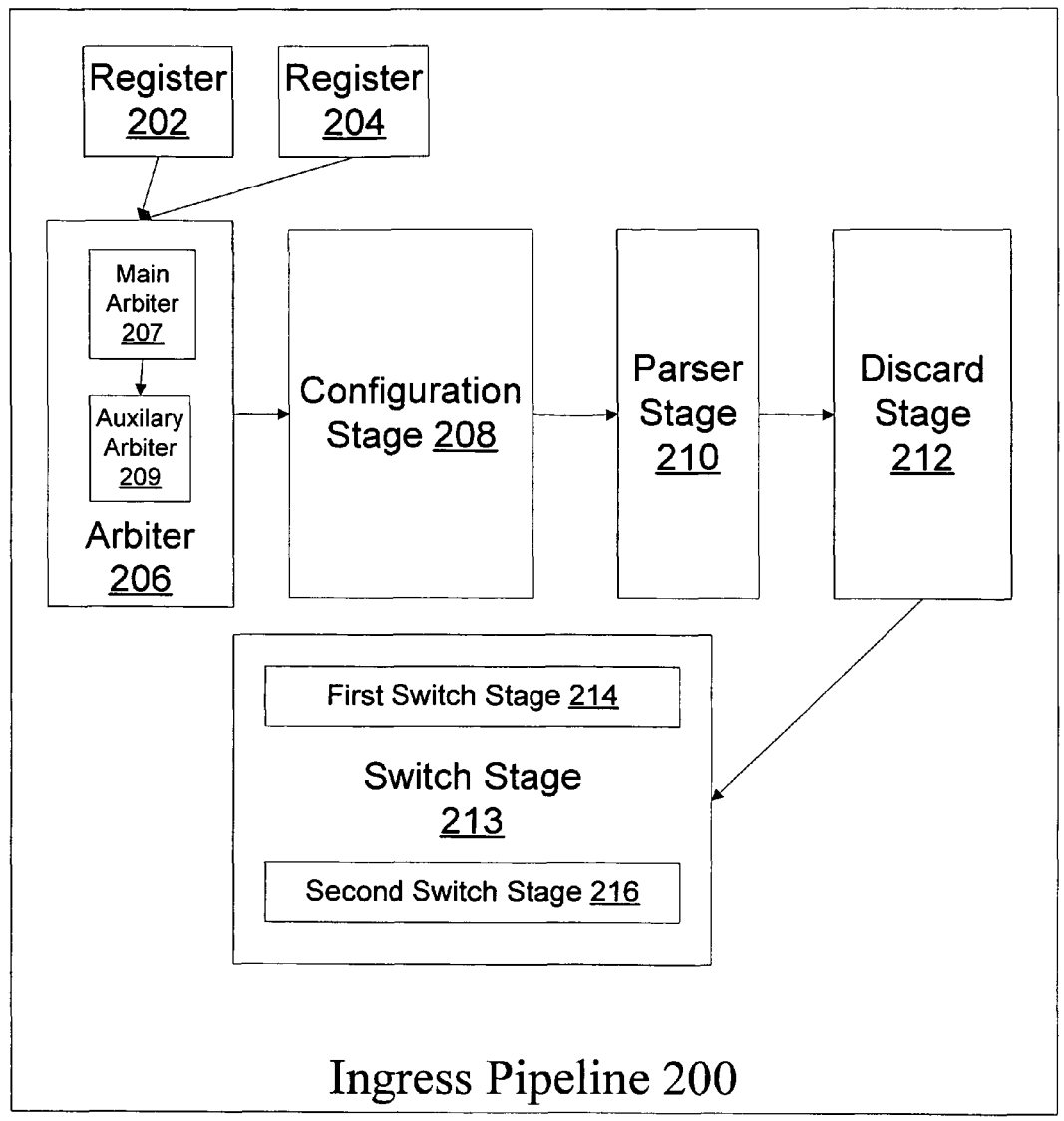
FIG. 2 illustrates a centralized ingress pipeline architecture, according to one embodiment of the present invention.

FIG. 2 illustrates a centralized ingress pipeline architecture 200 of ingress module 102. Ingress pipeline 200 processes incoming packets, primarily determines an egress bitmap and, in some cases, figures out which parts of the packet may be modified. Ingress pipeline 200 includes a data holding register 202, a module header holding register 204, an arbiter 206, a configuration stage 208, a parser stage 210, a discard stage 212 and a switch stage 213. Ingress pipeline 200 receives data from the XBOD, GBOD or CPU processing module 111 and stores cell data in data holding register 202. Arbiter 206 is responsible for scheduling requests from the GBOD, the XBOD and CPU. Configuration stage 208 is used for setting up a table with all major port-specific fields that are required for switching. Parser stage 210 parses the incoming packet and a high speed module header, if present, handles tunnelled packets through Layer 3 (L3) tunnel table lookups, generates user defined fields, verifies Internet Protocol version 4 (IPv4) checksum on outer IPv4 header, performs address checks and prepares relevant fields for downstream lookup processing. Discard stage 212 looks for various early discard conditions and either drops the packet and/or prevents it from being sent through pipeline 200. Switching stage 213 performs all switch processing in ingress pipeline 200, including address resolution.

According to one embodiment of the invention, the ingress pipeline includes one 1024-bit cell data holding register 202 and one 96-bit module header register 204 for each XBOD or GBOD. Data holding register 202 accumulates the incoming data into one contiguous 128-byte cell prior to arbitration and the module header register 204 stores an incoming 96-bit module header for use later in ingress pipeline 200. Specifically, holding register 202 stores incoming status information.

Ingress pipeline 200 schedules requests from the XBOD and GBOD every six clock cycles and sends a signal to each XBOD and GBOD to indicate when the requests from the XBOD and GBOD will be scheduled. CPU processing module 111 transfers one cell at a time to ingress module 102 and waits for an indication that ingress module 102 has used the cell before sending subsequent cells. Ingress pipeline 200 multiplexes signals from each of XBOD, GBOD and CPU processing based on which source is granted access to ingress pipeline 200 by arbiter 206. Upon receiving signals from the XBOD or GBOD, a source port is calculated by register buffer 202, the XBOD or GBOD connection is mapped to a particular physical port number on device 100 and register 202 passes information relating to a scheduled cell to arbiter 206.

When arbiter 206 receives information from register buffer 202, arbiter 206 may issue at least one of a packet operation code, an instruction operation code or a FP refresh code, depending on resource conflicts. According to one embodiment, the arbiter 206 includes a main arbiter 207 and auxiliary arbiter 209. The main arbiter 207 is a time-division multiplex (TDM) based arbiter that is responsible for scheduling requests from the GBOD and the XBOD, wherein requests from main arbiter 207 are given the highest priority. The auxiliary arbiter 209 schedules all non XBOD/GBOD requests, including CPU packet access requests, CPU memory/register read/write requests, learn operations, age operations, CPU table insert/delete requests, refresh requests and rate-limit counter refresh request. Auxiliary arbiter's 209 requests are scheduled based on available slots from main arbiter 207.

When the main arbiter 207 grants an XBOD or GBOD a slot, the cell data is pulled out of register 202 and sent, along with other information from register 202, down ingress pipeline 200. After scheduling the XBOD/GBOD cell, main arbiter 207 forwards certain status bits to auxiliary arbiter 209.

The auxiliary arbiter 209 is also responsible for performing all resource checks, in a specific cycle, to ensure that any operations that are issued simultaneously do not access the same resources. As such, auxiliary arbiter 209 is capable of scheduling a maximum of one instruction operation code or packet operation code per request cycle. According to one embodiment, auxiliary arbiter 209 implements resource check processing and a strict priority arbitration scheme. The resource check processing looks at all possible pending requests to determine which requests can be sent based on the resources that they use. The strict priority arbitration scheme implemented in an embodiment of the invention requires that CPU access request are given the highest priority, CPU packet transfer requests are given the second highest priority, rate refresh request are given the third highest priority, CPU memory reset operations are given the fourth highest priority and Learn and age operations are given the fifth highest priority by auxiliary arbiter 209. Upon processing the cell data, auxiliary arbiter 209 transmits packet signals to configuration stage 208.

Configuration stage 208 includes a port table for holding all major port specific fields that are required for switching, wherein one entry is associated with each port. The configuration stage 208 also includes several registers. When the configuration stage 208 obtains information from arbiter 206, the configuration stage 208 sets up the inputs for the port table during a first cycle and multiplexes outputs for other port specific registers during a second cycle. At the end of the second cycle, configuration stage 208 sends output to parser stage 210.

Parser stage 210 manages an ingress pipeline buffer which holds the 128-byte cell as lookup requests traverse pipeline 200. When the lookup request reaches the end of pipeline 200, the data is pulled from the ingress pipeline buffer and sent to MMU 104. If the packet is received on a high speed port, a 96-bit module header accompanying the packet is parsed by parser stage 210. After all fields have been parsed, parser stage 210 writes the incoming cell data to the ingress pipeline buffer and passes a write pointer down the pipeline. Since the packet data is written to the ingress pipeline buffer, the packet data need not be transmitted further and the parsed module header information may be dropped. Discard stage 212 then looks for various early discard conditions and, if one or more of these conditions are present, discard stage drops the packet and/or prevents it from being sent through the chip.

Switching stage 213 performs address resolution processing and other switching on incoming packets. According to an embodiment of the invention, switching stage 213 includes a first switch stage 214 and a second switch stage 216. First switch stage 214 resolves any drop conditions, performs BPDU processing, checks for layer 2 source station movement and resolves most of the destination processing for layer 2 and layer 3 unicast packets, layer 3 multicast packets and IP multicast packets. The first switch stage 214 also performs protocol packet control switching by optionally copying different types of protocol packets to the CPU or dropping them. The first switch stage 214 further performs all source address checks and determines if the layer 2 entry needs to get learned or re-learned for station movement cases. The first switch stage 214 further performs destination calls to determine how to switch a packet based on destination switching information. Specifically, the first switch stage 214 figures out the destination port for unicast packets or port bitmap of multicast packets, calculates a new priority, optionally traps packets to the CPU and drops packets for various error conditions. The first switch stage 214 further handles high speed switch processing separate from switch processing from port 109a-109f and switches incoming high speed packets based on stage header operation codes.

The second switch stage 216 then performs Field Processor (FP) action resolution, source port removal, trunk resolution, high speed trunking, port blocking, CPU priority processing, end-to-end Head of Line (HOL) resource check, resource check, mirroring and maximum transfer length (MTU) checks for verifying that the size of incoming/outgoing packets is below a maximum transfer length. The second switch stage 216 takes first switch stage 216 switching decision, any layer routing information and FP redirection to produce a final destination for switching. The second switch stage 216 also removes the source port from the destination port bitmap and performs trunk resolution processing for resolving the trunking for the destination port for unicast packets, the ingress mirror-to-port and the egress mirror-to-port. The second switch stage 216 also performs high speed trunking by checking if the source port is part of a high speed trunk group and, if it is, removing all ports of the source high speed trunk group. The second switch stage 216 further performs port blocking by performing masking for a variety of reasons, including meshing and egress masking.

Ingress module 102 then transmits the packet to MMU 104 which applies all resource accounting and aging logic to packet 200. Specifically MMU 104 uses a source port number to perform resource accounting. Thereafter, MMU 104 forwards the packet to egress module 106.

Figure 3:
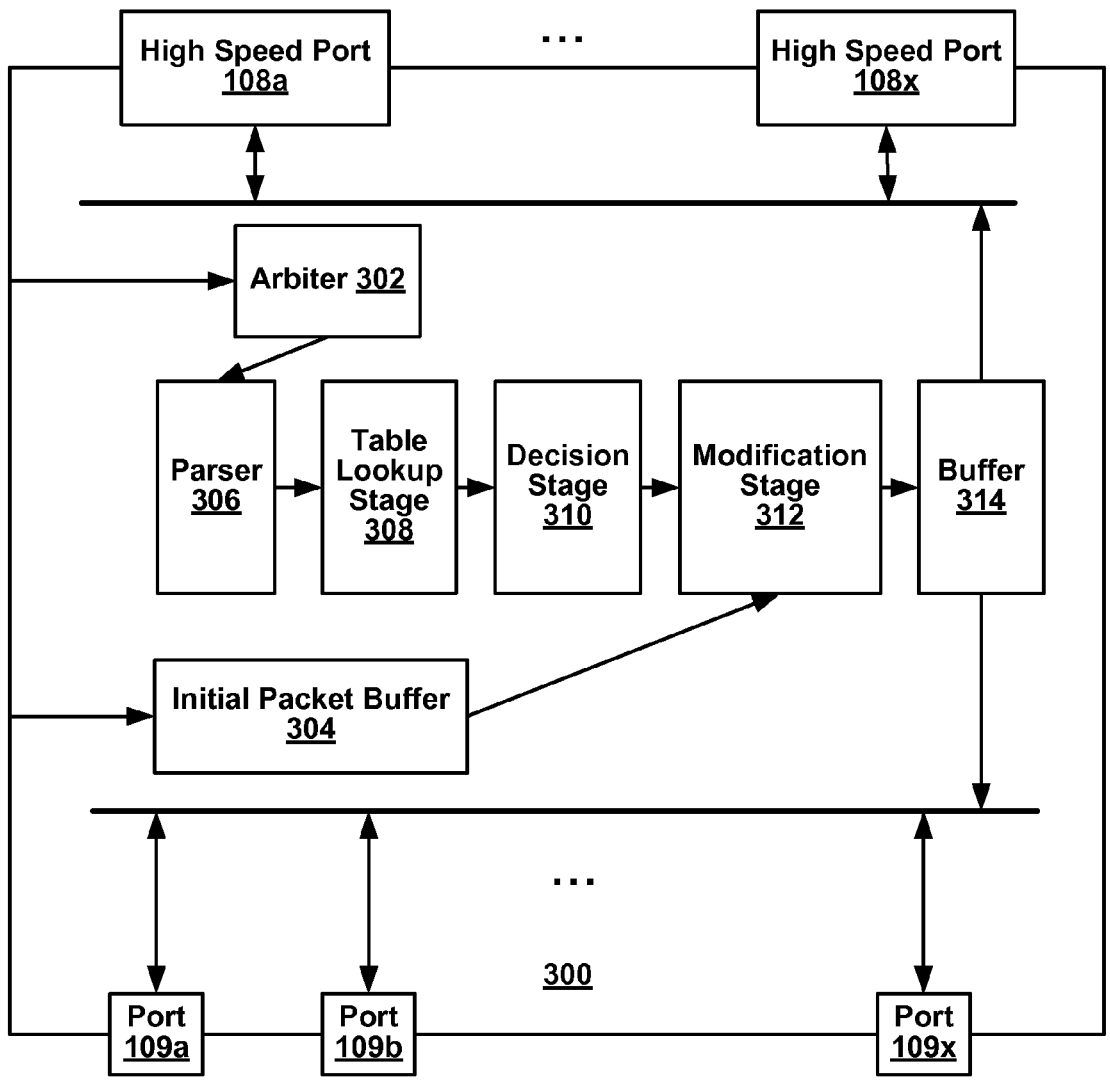
FIG. 3 illustrates a centralized egress pipeline architecture of an egress stage, according to one embodiment of the present invention.

FIG. 3 illustrates a centralized egress pipeline architecture 300 of egress stage 106. The egress pipeline includes an arbiter 302, parser 306, a table lookup stage 308, a decision stage 310, a modification stage 312 and a data buffer 314. The arbiter 302 provides arbitration for accessing egress pipeline resources between packet data and control information from MMU and information from the CPU. Parser 306 performs packet parsing for table lookups and modifications. Table lookup stage 308 performs table lookups for information transmitted from parser 306. Decision stage 310 is used for deciding whether to modify, drop or otherwise process the packet. Modification stage 312 makes modification to the packet data based on outputs from previous stages of the ingress module.

All incoming packet data from MMU 104 is transmitted to an initial packet buffer 304. In an embodiment of the invention, the initial packet buffer is 1044 bits wide and 18 words deep. Egress pipeline 300 receives two inputs, packet data and control information from MMU 104 and CPU operations from the s-bus. Initial packet buffer 304 stores packet data and keeps track of any empty cycles coming from MMU 104. Initial packet buffer 304 outputs its write address and parser 306 passes the latest write address with pipeline instructions to modification stage 314.

Arbiter 302 collects packet data and control information from MMU 104 and read/write requests to registers and memories from the CPU and synchronizes the packet data and control information from MMU 104 and writes the requests from the CPU in a holding register. Based on the request type from the CPU, arbiter 302 generates pipeline register and memory access instructions and hardware table initialization instructions. After arbiter 302 collects packet data, CPU requests and hardware table initialization messages, it generates an appropriate instruction which is transmitted to parser 306.

After receiving an instruction from arbiter 302, parser 306 parses packet data using control information and a configuration register transmitted from arbiter 302. According to an embodiment, the packet data is parsed to obtain L4 and L3 fields which appear in the first 148 bytes of the packet.

Figure 4:
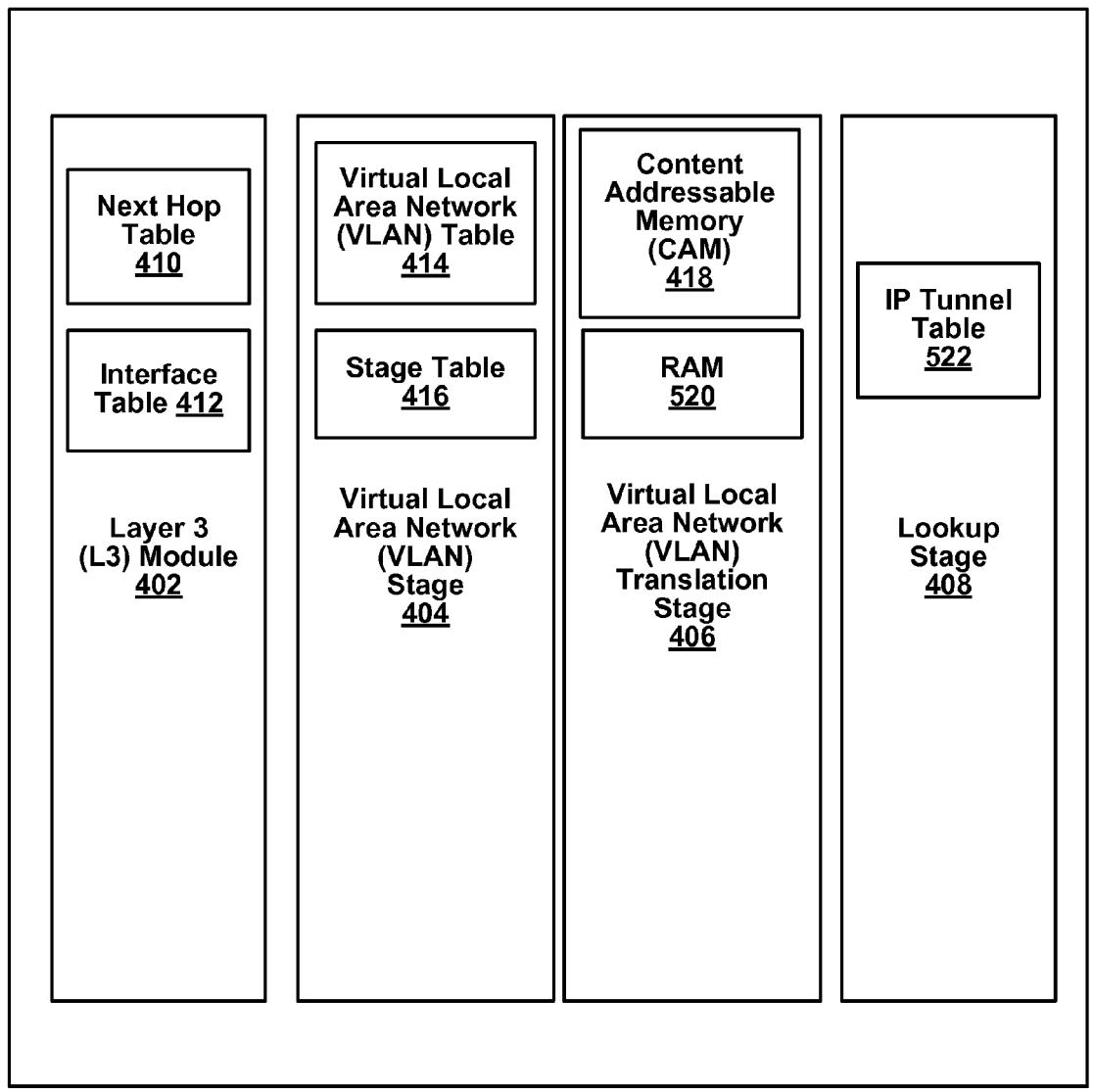
FIG. 4 illustrates an embodiment of a table lookup stage, according to one embodiment of the present invention.

Table lookup stage 308 then receives all packet fields and register values from parser 306. FIG. 4 further illustrates table lookup stage 308. Table lookup stage 308 includes a L3 Module 402, a VLAN stage 404, a VLAN translation stage 406, IP tunneling lookup stage 408. In an embodiment of the invention, L3 Module 402 includes a 8 k deep Next Hop Table 410 and a 4 K deep Interface table 412. Next Hop table 410 is indexed based on a 13 bit wide next hop index from MMU 104 and Next Hop table 410 provides a MAC Address and an Interface Number that is used, depending on the type of packet, to index Interface table 412. For all Memory Read Operation and Memory Write Operation instructions, table lookup stage 308 decodes the address and writes or reads data from corresponding tables.

VLAN stage 404 is used to obtain VLAN related information and a spanning tree state of an outgoing port. VLAN stage 404 includes a VLAN table 414 and a stage (STG) table 416. VLAN table 414 is indexed based on the VLAN IDs from either the packet or Interface table 412. If a VLAN table lookup results in a "miss", i.e., an invalid VLAN, then the packet may be dropped. If the VLAN entry is valid but the outgoing port is not a member of the VLAN, then the packet may be also dropped. The VLAN table outputs a VLAN membership, untagged bitmap, and a STG group number which is used to index STG table 416. STG table 416 outputs an STG vector which contains the spanning tree state of the outgoing ports. VLAN stage 404 also determines whether the packet should be modified in egress pipeline 300 for CPU and ingress mirroring cases.

VLAN translation stage 406 translates the incoming VLAN to a new one and searches various tables. VLAN translation stage 406 includes a Content Addressable Memory (CAM) 418 and an associated Data Random Addressable Memory (RAM) 520. CAM 418 is searched with the VLAN ID and the destination port number and if an associated entry is found, an address is obtained from CAM 418 to access the associated Data RAM 520.

IP tunneling lookup stage 408 obtains a partial Tunnel IP header from appropriate tables, registers and parsed packet fields. IP tunnelling lookup stage 408 includes a IP tunnel table 522 that is indexed issuing a tunnel index from interface table 412 and outputs tunnel type, among other information, which is used to distinguish among tunnel protocols that are implemented in egress pipeline 300.

Information from table lookup stage 308 is then transmitted to decision stage 310 where a decision is made as to whether to modify, drop or otherwise process the packet. For example, decision stage 310 first looks for flush bits at the beginning of the packet transmission and if the flush bits are set, the packets are marked "dropped". In an embodiment of the invention, if a flush bit for a packet is set for a packet already in transmission, the packet is completely transmitted and the next packet is flushed. In another example, MMU 104 may mark packets as Purge, Aged or Cell Error and decision stage 310 may either be dropped or transmit these packet but mark them as erroneous. In another example, if a VLAN translate feature is enabled, but there was a miss in CAM 418 lookup, the decision stage 310 may drop the packet if certain fields are set. Decision stage 310 also determines if the packet needs to be L4 switched or L3 routed and the type of mirroring functions that need to be performed on the packet.

Modification stage 312 thereafter constructs a Tunnel IP Header and a module header for the packet, makes replacement changes in the packet and computes IP checksum for outer and inner IP headers. Modification stage 312 receives a packet data interface from the initial buffer 304 which enables modification stage 312 to provide a read address to initial buffer 304 and in response obtain the packet data and basic control data. Modification stage 312 then generates Middle of Packet and End of Packet instructions based on the data received from initial buffer 304 and makes changes based on these commands. Modification stage 312 also receives all packet decisions and pipeline commands decision stage 310 and uses this information to make further changes to the packet. Specifically, all fields of the tunnel IP header which need to be filled by incoming packet fields are filled. Furthermore, IP checksum for the tunnel IP header is computed in parallel with the header construction. Modification stage 312 further reads back packets and control information from initial buffer 304 and performs all packet modifications and replacements of fields. It outputs CPU operations and hardware commands and data and addresses associated with them on one bus and outputs packet data and control information on another bus. Additionally, modification stage 312 performs physical encapsulation and decapsulation of headers and tag removal and insertions. If a packet is going to a high speed port, modification stage 312 converts the packet from Ethernet format to high speed format. Modification stage 312 also aligns the packet by padding packets smaller than 64 bytes and removes holes by aligning data to a 1314 bit boundary. Thereafter, a 1314 bit "complete" data word is output from modification stage 312 to the data buffer 314.

Data buffer 314 stores completed data words from modification stage 312 in memory. Before the egress pipeline 300 sends packets out to destination ports 109a-109x, the packet data are stored in the data buffer 314 for pipeline latency and port speed matching. Data buffer 314 is capable of requesting data from MMU 104 whenever it has a free space.

Figure 5:
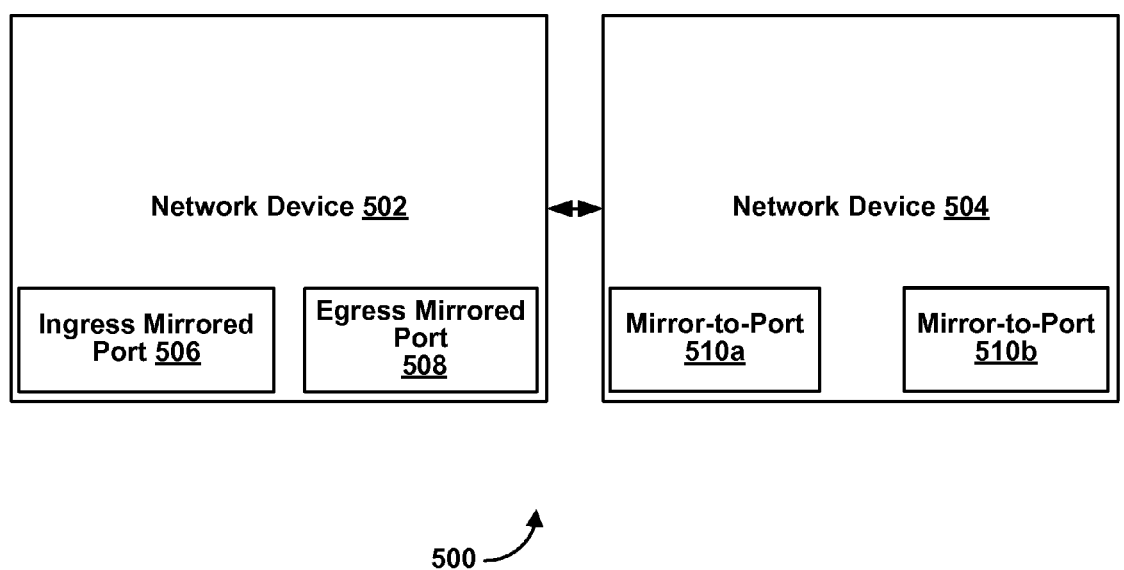
FIG. 5 illustrates an embodiment of a network in which mirroring may be implemented.

FIG. 5 illustrates an embodiment of the invention in which mirroring is implemented on at least two network devices, as described above, in a network. The network 500 includes first device 502 and a second device 504. First network device 502 includes an ingress mirror port 506 and an egress mirror port 508 and second network device 504 includes two mirror-to ports 510a and 510b. Each of devices 502 and 504 supports different types of mirroring, including ingress mirroring, egress mirroring, MAC-based (i.e. address-based) mirroring and Fast Filter Processor (FFP) mirroring. Ingress mirrored packets are sent as unmodified packets and egress mirrored packets are always sent modified with a VLAN tag, subject to certain limitations. If the packet is ingress and egress mirrored, two copies of the packet are sent to the mirror-to-ports, the unmodified packet to the ingress mirror-to-port and the modified packet to the egress mirror-to-port. For a mirrored packet, no VLAN membership check is performed since the mirror-to-port does not need to be a member of all VLANs. For FFP mirroring, based on a filter classification that is used in FFP mirroring, one of the policy actions may be to ingress and/or egress mirror the packet.

Specifically, for each port 506-510, a Mirror_Control register includes an ingress mirror-to-port index, an egress mirror-to-port index, a non unicast mirror-to-port index and the Mirror_Enable bit. The ingress mirror-to-port index specifies to which port the ingress packet needs to be mirrored. The egress mirror-to-port index specifies to which port the egress packet needs to be mirrored. The non unicast mirror-to-port index specifies the mirror-to port for egress mirrored broadcast and multicast packets. The Mirror_Enable bit enables mirroring on the associated ingress, egress, MAC and FP port. Each port 506-510 further includes a port table with a mirror bit for enabling mirroring on that port and a layer 2 table with a mirror entry for enabling mirror on a destination address hit. Each port 506-510 also includes an Emirror_Control register which includes a destination bitmap for specifying which egress ports are to be mirrored.

In specific embodiments, up to four mirrored-to ports may be selected for both ingress and egress mirroring. It should be noted that the ingress mirror-to-ports and egress mirror-to-ports could be the same ports or different ports. As such, there may exist a total of eight mirror-to-ports on each chip and up to 512 mirror-to-ports in a system. A mirror-to-port can be a logical port/trunk, in which case, after trunk resolution, a determination is made as to which of the physical ports in the trunk the packet needs to go out on. It should be noted that switching and mirroring are allowed on local mirror-to-ports.

To enable ingress mirroring on a port, the Mirror_Enable bit in the Mirror_Control register and the mirror bit in the port table in the ingress port are set. In an embodiment of the invention, the Mirror_Enable bit and the mirror bit are set to enable ingress mirroring regardless of the packet type, i.e., layer 2, unicast or multicast for example. To enable egress mirroring for a port, the egress port's bit in the Emirror_Control register bitmap of the ingress port, for local egress port, or the stack port on the egress module, for remote egress port, is set.

According to one embodiment of the invention, when a packet is received on ingress port 506, ingress module 102 in device 502 determines if the packet is to be ingress mirrored based on the ingress port. If it is, the ingress mirror bit is set and an ingress mirror-to-port index is set to the port's ingress mirror-to-port index. If it is not, the mirror bit is cleared. Thereafter, ingress module 102 in device 502 determines if the packet is to be egress mirrored based on the port and MAC destination address. If it is, the egress mirror bit is set and an egress mirror-to-port index is set to the egress port's mirror-to-port index. If it is not, the egress mirror bit is cleared. Ingress module 102 then determines if the Mirror_Enable bit is set and if the packet is to be FP Ingress Mirrored. If both the Mirror_Enable bit is set and the action in an associated FP entry is to ingress mirror the packet, the ingress mirror bit is set and an ingress mirror-to-port index is set to the FP ingress mirror-to-port index. Ingress module 102 then determines if the Mirror_Enable bit is set and if the packet is to be FP Engress Mirrored, and if both conditions are true, the egress mirror bit is set and an egress mirror-to-port index is set to the FP egress mirror-to-port index. Note that the FFP policy action overrides previously made mirroring determinations in the ingress module.

The packet is then transmitted to MMU 104 in device 502 with the ingress mirror bit, the egress mirror bit, the ingress mirror-to-port index and the egress mirror-to-port index. Thereafter, MMU 104 may send up to three copies of the packet depending on if the packet needs to be switched, ingress mirrored and/or egress mirrored.

Specifically, MMU 104 sends a first copy to a switched port if a switch bit is on; MMU 104 also sends a second copy to an ingress mirror-to-port if the ingress mirror bit is on; MMU 104 further sends a third copy to an egress mirror-to-port if the egress mirror bit is on and the ingress mirror bit and switch bit are off. For the first packet, normal packet switching is performed. For the second packet, MMU 104 indexes the mirror-to-port table to obtain the mirror-to-port destination module ID and mirror-to-port port and determines if the mirror-to-port is a local port. If it is, the packet is sent unmodified to the local mirror-to-port. If it is not, a high speed header is constructed and an unmodified packet is sent on the high speed port 108. For ingress mirroring, one copy of the unmodified packet is sent for broadcast and multicast packets and for IP multicast packets.

For the third packet, MMU 104 indexes the mirror-to-port table to obtain the mirror-to-port destination module ID and mirror-to-port port and determines if the mirror-to-port is a local port. If it is, the packet is sent modified to the local mirror-to-port. If it is not, a high speed header is constructed and a modified packet is sent on high speed port 108. For egress mirroring, one copy of the modified packet is sent for broadcast and multicast packets and for IP multicast packets and the packet is always tagged.

Thus, for a L2 switched packet, as shown in FIG. 5, that is received on the network device 502, its destination address is determined through an address resolution process, as discussed above. Assuming that ingress port 506 is mirrored and the destination port is also mirrored, the unmodified packet is forwarded to the mirrored-to port 510*a* on network device 504 through the switch fabric. A modified packet is sent also to port 508, which is the destination address for the packet. A copy of the modified packet is also sent to mirrored-to port 510*b* on device 504, which contains the egress mirrored-to-port.

As discussed above and illustrated in FIG. 5, three versions of the packet are sent through a series of switches. A first is a modified version of the packet that is sent to the destination port 508 of device 502. The header of the original packet is modified when the packet is sent out egress port 508 of device 502 to reach its ultimate destination. Since the destination port has a mirrored-to-port 510*b*, on device 504, a copy of the modified packet is also sent out that mirrored-to-port. Lastly, since the ingress port 506 on device 502 is also mirrored, an unmodified packet is sent to ingress mirror-to port 510*a* on device 504.

While the above-discussed embodiment illustrates both ingress and egress mirroring over a series of devices, the present invention is also applicable to mirroring of ports of a device to a mirrored-to-port on the same device. It is also applicable to one type of mirroring, i.e. egress, ingress or MAC-based, without use of other types of mirroring in the same device.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above.

It would also be within the scope of the invention to implement the disclosed elements of the invention in discrete electronic components, thereby taking advantage of the functional aspects of the invention without maximizing the advantages through the use of a single semiconductor substrate.

With respect to the present invention, network devices may be any device that utilizes network data, and can include switches, routers, bridges, gateways or servers. In addition, while the above discussion specifically mentions the handling of packets, packets, in the context of the instant application, can include any sort of datagrams, data packets and cells, or any type of data exchanged between network devices.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A network device for implementing mirroring on packets, the network device comprising:
    a plurality of ports, each of the plurality of ports being at least one of an ingress port, an egress port and a mirror-to port;
    respective Mirror_Control registers corresponding with each of the plurality of ports, each Mirror_Control register being configured to store one or more mirroring indices and a Mirror_Enable bit, the Mirror_Enable bit being configured to enable mirroring for a respective port of the plurality of ports; and
    a processing module configured to perform a plurality of packet mirroring types,
    wherein each of the respective Mirror_Control registers is configured to support the plurality of packet mirroring types, and
    wherein, to perform packet mirroring at each ingress port, egress port and mirror-to port, when an incoming packet is received, the respective Mirror_Enable bit is examined to determine if packet mirroring is enabled and the respective one or more mirroring indices are examined to determine which of the plurality of packet mirroring types to apply to the packet.

2. The network device according to claim 1, wherein the ingress port is configured to perform at least one of ingress mirroring, egress mirroring, address based mirroring and predefined table mirroring on the packets.

3. The network device according to claim 1, wherein the network device is configured to perform ingress mirroring of a packet by sending an unmodified packet to an ingress mirrored-to-port.

4. The network device according to claim 1, wherein the network device is configured to perform egress mirroring of a packet by sending a modified packet to an egress mirrored-to-port.

5. The network device according to claim 1, wherein the network device is configured to perform table based mirroring of a packet by using an associated action to perform at least one of ingress mirroring and egress mirroring of the packet.

6. The network device according to claim 1, wherein the respective one or more mirroring indices of each respective Mirror_Control register comprise:
    an ingress mirror-to-port index for specifying to which port an ingress packet should be mirrored;
    an egress mirror-to-port index for specifying to which port an egress packet should be mirrored; and
    a non-unicast mirror-to-port index for specifying to which port an egress multicast packet should be mirrored.

7. The network device according to claim 1, wherein the network device comprises a port table that stores a mirror bit for enabling mirroring at an associated port and a layer 2 table for enabling mirroring on a specific destination address.

8. The network device according to claim 1, wherein the respective Mirror_Control registers are configured to store a destination bitmap for specifying which egress ports are to be mirrored.

9. The network device according to claim 1, wherein a predefined number of the plurality of ports are configured as ingress ports and egress ports.

10. The network device according to claim 1, wherein the network device comprises:
an ingress module for setting appropriate bits of an incoming packet if the incoming packet is to be at least one of ingress mirrored or egress mirrored; and
a management unit for generating a plurality of packets, depending upon the set bits in the packet, wherein for each of the plurality of packets normal processing or mirroring is performed.

11. A method for implementing mirroring on packets, the method comprising:
associating a plurality of ports as at least one of an ingress port, an egress port and a mirror-to port;
storing, for each of the plurality of ports, one or more mirroring indices and a Mirror_Enable bit in a respective Mirror_Control register, each Mirror_Enable bit being configured to enable mirroring for a respective port of the plurality of ports;
storing, in each respective Mirror_Control register, information for supporting a plurality of packet mirroring types;
receiving, at one of the plurality of ports, an incoming packet; and
examining the respective Mirror_Enable bit and the respective one or more mirroring indices of the one of the plurality of ports to determine, respectively, if packet mirroring is enabled and which of the plurality of the plurality of packet mirroring types to apply to the incoming packet.

12. The method according to claim 11, further comprising performing at least one of ingress mirroring, egress mirroring, address based mirroring and predefined table mirroring.

13. The method according to claim 12, wherein performing the ingress mirroring of a packet comprises sending an unmodified packet to an ingress mirrored-to-port.

14. The method according to claim 12, wherein performing egress mirroring of a packet comprises sending a modified packet to an egress mirrored-to-port.

15. The method according to claim 12, wherein performing predefined table mirroring of a packet comprises using an associated action to perform at least one of ingress mirroring and egress mirroring of the packet.

16. The method according to claim 12, further comprising enabling mirroring at an associated port in accordance with a port table, the port table including:
a mirror bit configured to enable mirroring at the associated port; and
a layer 2 table including a destination address for the mirroring at the associated port.

17. The method according to claim 12, further comprising configuring a predefined number of the plurality of ports as at least one of ingress ports and egress ports.

18. The method according to claim 12, further comprising:
respectively setting, by an ingress module, appropriate bits of incoming packets if the incoming packets are to, respectively, be at least one of ingress mirrored or egress mirrored; and
generating by a management unit, a plurality of packets in accordance with the set bits in each packet of the plurality of packets, wherein, for each of the plurality of packets, normal processing or mirroring is performed.

19. The method according to claim 11, further comprising, for each of the plurality of ports:
specifying, with an ingress mirror-to-port index in the respective Mirror_Control register, to which port an ingress packet should be mirrored;
specifying, with an egress mirror-to-port index in the respective Mirror_Control register, to which port an egress packet should be mirrored;
specifying, with a non-unicast mirror-to-port index in the respective Mirror_Control register, to which port an egress multicast packet should be mirrored.

20. A apparatus for implementing mirroring on packets, the apparatus comprising:
associating means for associating a plurality of ports as at least one of an ingress port, an egress port and a mirror-to port;
respective register means for each of the plurality of ports, each of the respective register means for storing:
one or more mirroring indices for supporting one or more of a plurality of packet mirroring types for the respective port of the plurality of ports; and
a Mirror_Enable bit for enabling mirroring for the respective port of the plurality of ports;
setting means for setting the one or more mirroring indices and the Mirror_Enable bit for each respective register means;
receiving means for receiving an incoming packet at one of the plurality of ports; and examining means for:
examining the respective Mirror_Enable bit of the one of the plurality of ports to determine if packet mirroring is enabled; and
examining the respective one or more mirroring indices of the one of the plurality of ports to determine which of the plurality of packet mirroring types to apply to the incoming packet.

* * * * *

UNITED STATES PATENT AND TRADEMARK OFFICE
CERTIFICATE OF CORRECTION

| | | |
|---|---|---|
| PATENT NO. | : 8,005,084 B2 | Page 1 of 1 |
| APPLICATION NO. | : 11/289366 | |
| DATED | : August 23, 2011 | |
| INVENTOR(S) | : Mohan Kalkunte et al. | |

It is certified that error appears in the above-identified patent and that said Letters Patent is hereby corrected as shown below:

In column 1, line 9, delete "60/668,403," and insert -- 60/686,403, --, therefor.

In column 11, line 38-39, in claim 11, after "of the plurality" delete "of the plurality".

In claim 12, line 15, in claim 18, delete "generating" and insert -- generating, --, therefor.

In claim 12, line 30, in claim 20, delete "A" and insert -- An --, therefor.

Signed and Sealed this
Twenty-fifth Day of October, 2011

David J. Kappos
*Director of the United States Patent and Trademark Office*